Patented Feb. 13, 1951

2,541,957

UNITED STATES PATENT OFFICE 2,541,957

PREPARATION OF MALONATES

Willard J. Croxall, Bryn Athyn, and John O. Van Hook, Philadelphia, Pa., assignors to Rohm & Haas Company, Philadelphia, Pa., a corporation of Delaware No Drawing. Application March 31, 1949,
Serial No. 84,757

5 Claims. (Cl. 260—485)

This invention relates to the preparation of C-substituted malonates in which the C-substituent is olefinically unsaturated in the beta-gamma-position thereof. The method of preparation comprising forming an allylically unsaturated ether maleate, rearranging it by heating, and decarbonylating it by heating at 150° to 250° C. For the preparation of the ether maleate the most convenient method includes transetherification of a lower dialkoxysuccinate or alkoxymaleate with an allylically unsaturated alcohol in the presence of an alkaline earth metal alcoholate.

This application is a continuation-in-part of our application Serial No. 52,601, filed October 2, 1948, wherein it was shown that, when an alpha,alpha-di(alkoxy)succinate is heated with an alcohol in the presence of an alkaline catalyst, it is transetherified and transesterified. An alpha-alkoxymaleate acts similarly. During the reaction diether succinate may be dealcoholated to ether maleate. In our prior application we pointed out that, when beta-gamma-unsaturated alcohols are used as reactants, the transetherification is followed or accompanied by dealcoholation of the diether succinate to ether maleate. We now find that, when the transetherification step and dealcoholation are accomplished in the presence of an alkaline earth metal alcoholate, the ether maleate having an allylic ether substituent may then be transformed and then decarbonylated to yield an allylmalonate.

The invention can readily be understood through consideration of the chemical reactions involved, as will now be illustrated with use of general formulas and equations:

$$(RO)_nCCH_nCO_2R + R^0OH$$
$$|$$
$$CO_2R$$

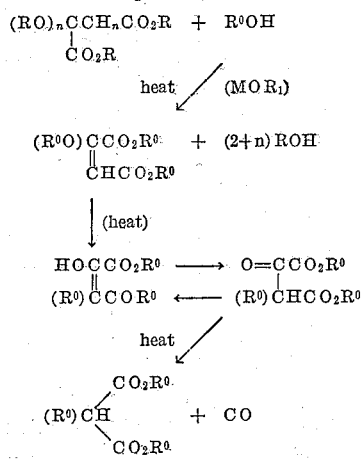

In the above formulas R represents a lower alkyl group, preferably the methyl and ethyl groups, $n$ represents an integer from one to two, $R^0$ represents an allylically unsaturated residue of a monohydric alcohol, and $(R^0)$ represents the allylic group rearranged. $MOR_1$ is an alkaline earth metal alcoholate.

The allylically unsaturated alcohol $R^0OH$ may be designated with greater detail as $$R'CH=CHCH_2OH$$

wherein $R'$ represents hydrogen or a lower alkyl group from methyl to butyl. When $R'$ is hydrogen, $R^0$ becomes specifically the allyl group proper, $CH_2=CHCH_2-$. It may represent also such 2,3-unsaturated groups as 3-methallyl (crotyl), 3-ethallyl, or 3-butallyl. The 3-phenallyl (cinnamyl) group appears to be useful but leads to very high boiling products.

When rearrangement occurs in the change from an alloxymaleate to an alpha-hydroxy-beta-allylmaleate by heating the alloxymaleate at 150° to 250° C., the group $R'CH=CHCH_2-$ becomes $CH_2=CHCH(R')-$. When, however, $R'$ is alkyl, the relative position of such substituent is changed in the rearrangement. Thus, $CH_3CH=CHCH_2-$, the crotyl residue, appears as

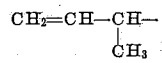

and $R'CH=CHCH_2-$ is changed to

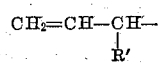

The diether succinates and ether maleates referred to above may be synthesized by several methods. A useful one is through the reaction of acetylene on carbonate esters in the presence of strongly basic alkaline catalyst, as described in application Serial No. 52,607, filed by Croxall and Schneider on October 2, 1948, now Patent No. 2,535,012. As there shown, while the main products are diether propionates and ether acrylates, there are also obtained diether succinates and ether maleates.

Acetylene is run into a mixture containing a carbonic acid-monohydric alcohol ester and catalyst at 20° to 110° C. After acetylene is no longer taken up by the mixture, the catalyst is destroyed as by neutralization with acid or by washing and the reaction products are isolated, usually by distillation. For purposes of the present invention the diether succinates and ether maleates may be collected in a single fraction.

If desired, the diether succinates may be converted to ether maleates by heating in the presence of an alkali metal acid sulfate and distilling off a mole of alcohol per mole of succinate. Details of this process are given in application Serial No. 52,608, filed by Croxall and Schneider on October 2, 1948. The use of an oxymaleate sometimes proves advantageous in that one mole of alcohol is disposed of before the transetherification and transformation reactions are attempted.

In the reaction of acetylene and carbonate there is used a strongly basic anhydrous catalyst, such as lithium methylate, sodium ethylate, potassium butoxide, or other alkali metal alcoholate, an alkali metal acetylide, such as potassium acetylide or sodium acetylide, and strongly basic quaternary ammonium alcoholates, such as tetramethyl ammonium methylate, benzyl trimethyl ammonium methylate, ethylate, propylate, or tert.-butoxide, dibenzyl dimethyl ammonium ethylate, etc.

The esters of carbonic acid used have the formula $(RO)_2CO$ where R is a radical of a non-tertiary monohydric alcohol which is free of acidic hydrogen and groups reacting with strong alkali. While this group may be widely varied and be aliphatic, cycloaliphatic, or arylaliphatic, saturated or unsaturated, for purposes of the present invention it is the residue of an alcohol which boils below the allylically unsaturated alcohol used for transetherification. For practical purposes it is desirable to use the smallest convenient groups as R; i. e., the methyl and ethyl groups. These are available through use of methyl carbonate and ethyl carbonate as reactants with acetylene.

The preparation of a typical diether succinate by the above-described method follows. As apparatus, there was used a five-liter flask equipped with a gas-tight stainless steel stirrer, the blades of which scraped the bottom of the flask. For the preparation of catalyst 225 grams of anhydrous ethyl alcohol was placed therein and sodium in small cubes was gradually added for a total of 30 grams of this metal. The sodium was dissolved and excess alcohol was evaporated under reduced pressure, the sodium ethylate remaining as a dry powder. Thereto was added 2200 grams of anhydrous diethyl carbonate. The flask was then equipped with gas inlet and outlet tubes, a manometer, and a thermometer. It was flushed with nitrogen and heated to about 80° C. Acetylene was passed into the system. This gas was drawn from a commercial cylinder but was scrubbed with water and sulfuric acid and then passed over soda-lime. When the rate of absortion of acetylene became very slow, the flask was cooled and the flow of acetylene was discontinued. Dilute acetic acid was added to the system to destroy the alkaline catalyst. Two layers formed in the flask. The upper, oily layer was separated and fractionally distilled.

After a forerun had been taken off at normal pressure, the forerun consisting of ethyl alcohol and ethyl carbonate, distillation was conducted under reduced pressure. Fractions of ethyl beta-ethoxyacrylate and ethyl beta,beta-diethoxypropionate were obtained. Between 75° C./4 mm. and 114° C./3 mm. a mixture of ethyl beta,beta-diethoxypropionate and diethyl alpha,alpha-diethoxysuccinate was taken off. At 114°–115° C./3-4 mm. diethyl alpha,alpha-diethoxysuccinate was obtained and on further distillation a fraction containing this succinate and diethyl alpha-ethoxymaleate was taken off.

In this same way from dimethyl carbonate there are prepared dimethyl alpha,alpha-dimethoxysuccinate and dimethyl alpha-methoxymaleate. Yet other diether succinates and ether maleates are similarly obtainable.

Reaction of one or more of the above diesters of an allylically unsaturated alcohol, $R^0OH$, is effected between 75° C. and 250° C., preferably 100° C. to 200° C., at normal or increased or reduced pressures. During the reaction the alcohol ROH is displaced and taken off.

The first reactions which occur in the presence of a basic catalyst when a diether succinate (or ether maleate) is heated with an allyl alcohol may be illustrated with alpha,alpha-dimethoxysuccinate and allyl alcohol, thus

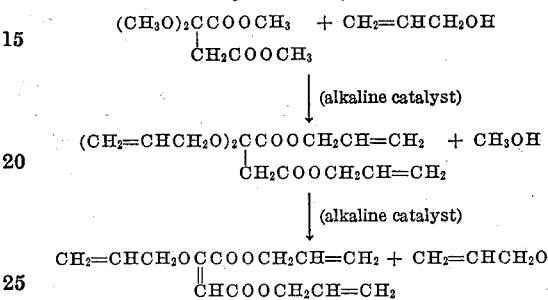

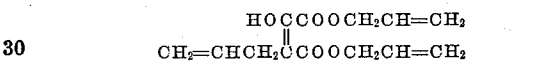

The transetherified ether maleate is rearranged under the influence of heat to give

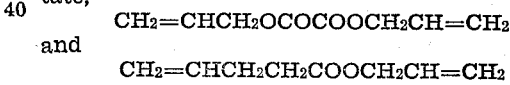

which is an enol form in equilibrium with a keto form.

When alkali metal catalysts are used, the reactions do not stop at this point but proceed to yield alkyl oxalates and allylacetates. Thus, when sodium methylate is used, as a typical alkali metal catalyst, reactions continue through to dimethallyl oxalate and methallyl methallylacetate, $CH_2=CHCH_2OCOCOOCH_2CH=CH_2$ and $CH_2=CHCH_2CH_2COOCH_2CH=CH_2$ We have found, however, that when an alkaline earth metal is used as the catalyst, desirably in the form of an alcoholate, the reaction does not develop into the above decompositions. The alloxymaleate may be separated and heated at 150° to 250° C. to cause decarbonylation and yield an allylmalonate. Thus, to continue the above illustration, there is formed from allyl alcohol and ether succinate or maleate the product

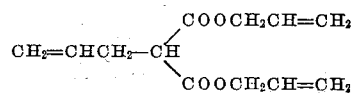

Suitable catalysts for accomplishing the above result are magnesium methylate, magnesium ethylate, calcium ethylate, magnesium butoxide, magnesium alloxide, and the like. An amount of 1% to 25% of the weight of the starting ether succinate or maleate is ample to promote the desired chemical changes.

The above reaction is effected by heating together an ether succinate or maleate

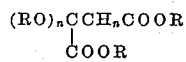

and an allyl alcohol

in the presence of an alkaline earth metal alcoholate, displacing the alcohol ROH, and heating the resulting transetherified product at 150° to 250° C. After transetherification has been effected, the catalyst may be destroyed, for the subsequent transformation and decarbonylation appear to be thermal effects. The allylmalonates formed are generally distillable at low pressures.

Examples of the preparation of esters of allylmalonic acids are given to illustrate the invention.

*Example 1*

A mixture of 103 grams of dimethyl alpha,-alpha-dimethoxysuccinate, 174 grams of allyl alcohol, and magnesium alloxide, prepared from 5 grams of magnesium reacted with allyl alcohol, was heated in a flask under a four-foot column. At overhead temperatures of 64–69° C. there was taken off 68 grams of methanol. Pressure was then reduced and allyl alcohol was distilled from the mixture, the distillation of this alcohol being completed under reduced pressure. Dilute sulfuric acid solution was then added to destroy the catalyst. The mixture was washed with water, dried over anhydrous magnesium sulfate, and heated from 100° to 190° C. for twenty minutes. About two liters of carbon monoxide were evolved during this time. The mixture was then subjected to distillation under reduced pressure. At 89° to 120° C./2 mm. there was obtained a product which corresponded in composition to allyl allylmalonate. The residue was then heated to 200° C. for thirty minutes. Carbon monoxide was again evolved. The product was again distilled at low pressure. The two distillates were combined and redistilled. The product thus obtained boiled at 93° C./0.5 mm. It had a refractive index, $n_D^{20}$, of 1.4545, a density, $$d_{20}^{20}$$

of 1.030, a molecular refraction, $MR_D$, of 59.03, and a saponification equivalent of 114. The theoretical value for $MR_D$ is 59.53 and for saponification equivalent 112.

*Example 2*

A mixture of 130 grams of diethyl alpha,-alpha-diethoxysuccinate, 170 grams of allyl alcohol, and 30 grams of magnesium alloxide was heated in a flask under a fractionating column until the theoretical amount of ethanol had been taken off. The reaction mixture was then subjected to distillation under reduced pressure until ally alcohol was no longer readily evolved. The mixture was then heated until the temperature of the batch was 200° C. Carbon monoxide was evolved. The batch was then fractionally distilled. The main fraction was identified as allyl allymalonate, boiling at 93° C./0.5 mm. and having a saponification equivalent of 113.

*Example 3*

A mixture of 100 grams of dimethyl alpha,-alpha-dimethoxysuccinate, 200 grams of crotyl alcohol, and the alcoholate from five grams of magnesium and crotyl alcohol was heated in a flask under a fractionating column. Methanol was displaced as in Example 1 and free crotyl alcohol was taken off under reduced pressure. The catalyst was destroyed with dilute sulfuric acid. The reaction mixture was washed with water, dried, and heated at 190° to 210° C. for twenty minutes. There was then distilled at 100° to 120° C./1–2 mm. a fraction which corresponded in composition to dicrotyl 1-methyl-2-propenylmalonate.

In the same way other beta,gamma-unsaturated monohydric alcohols may be used in place of the above alcohols. In each case transetherification and transesterification are followed by rearrangement and decarbonylation to yield corresponding malonates. These are useful intermediates for forming barbiturates. One C-allyl group is provided from the above esters and a second C-substituent is readily introduced by conventional methods.

*Example 4*

The influence of a more strongly basic catalyst than an alkaline earth metal alcoholate is shown in this example. A mixture of 206 grams of dimethyl alpha,alpha-dimethoxysuccinate and 174 grams of allyl alcohol was heated in a flask equipped with a packed distilling column. A solution of four grams of sodium in allyl alcohol was slowly added while the mixture was heated and methanol was distilled therefrom. Excess allyl alcohol was then distilled off. The residue was cooled, neutralized with dilute hydrochloric acid and washed with water. It was dried over dehydrated calcium sulfate and distilled. There was obtained at 57°–59° C./10 mm. a fraction which corresponded in composition to allyl allylacetate. At 64°–90° C./1 mm. there was obtained a fraction which corresponded in composition with diallyl oxalate. It was redistilled at 70°–71° C./1 mm. It had a refractive index of 1.4455, a density of 1.109, a molecular refraction of 41.34 (theory, 41.51), and a saponification equivalent of 87 (theory, 85).

We claim:

1. A process for preparing malonates of the formula

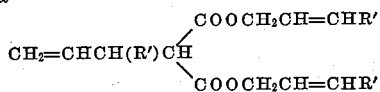

wherein R' is selected from the class consisting of hydrogen and the methyl group, which comprises reacting by heating an ether ester of the formula

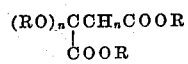

wherein $n$ is an integer from one to two and R is an alkyl group of not over two carbon atoms, with an allylic alcohol R'CH=CHCH₂OH, R' having the above-defined meanings, in the presence of an alkaline earth metal alcoholate as catalyst, removing an alcohol ROH from the reaction mixture, whereby a transetherified ester is formed, heating said transetherified ester at 150° to 250° C. whereby it is rearranged and decarbonylated and said malonate is formed.

2. The process of claim 1 wherein the ether ester is diethyl diethoxysuccinate.

3. The process of claim 2 wherein the allylic alcohol is allyl alcohol, CH₂=CHCH₂OH.

4. The process of claim 1 wherein the ether ester is dimethyl dimethoxysuccinate.

5. The process of claim 4 wherein the allylic alcohol is allyl alcohol.

WILLARD J. CROXALL.
JOHN O. VAN HOOK.

REFERENCES CITED

The following references are of record in the file of this patent:

UNITED STATES PATENTS

| Number | Name | Date |
|---|---|---|
| 2,251,765 | Sorenson | Aug. 5, 1941 |
| 2,281,394 | Sorenson | Apr. 28, 1942 |
| 2,346,612 | Rothrock | Apr. 11, 1944 |